United States Patent [19]
Ricciardi

[11] Patent Number: 5,889,846
[45] Date of Patent: Mar. 30, 1999

[54] METHOD AND SYSTEM FOR INITIATING A SOFTWARE DEFINED NETWORK CALL VIA A NETWORK ADJUNCT PLATFORM

[75] Inventor: Dominic M. Ricciardi, Bridgewater, N.J.

[73] Assignee: AT&T Corp, Middletown, N.J.

[21] Appl. No.: 798,531

[22] Filed: Feb. 10, 1997

[51] Int. Cl.⁶ .............................. H04M 3/42; H04M 3/00
[52] U.S. Cl. ..................... 379/219; 379/207; 379/209; 379/230; 379/243
[58] Field of Search ..................................... 379/201, 207, 379/209, 210, 211, 212, 219, 220, 221, 229, 230, 115, 127, 243

[56] References Cited

U.S. PATENT DOCUMENTS

| | | | |
|---|---|---|---|
| 4,756,020 | 7/1988 | Fodale | 379/112 |
| 5,103,475 | 4/1992 | Shuen | 379/115 |
| 5,367,566 | 11/1994 | Moe et al. | 379/243 |
| 5,369,695 | 11/1994 | Chakravarti et al. | 379/211 |
| 5,432,845 | 7/1995 | Burd et al. | 379/210 |
| 5,481,603 | 1/1996 | Gutierrez et al. | 379/221 |
| 5,506,893 | 4/1996 | Buscher et al. | 379/127 |
| 5,550,911 | 8/1996 | Bhagat et al. | 379/220 |
| 5,692,033 | 11/1997 | Farris | 379/209 |
| 5,751,792 | 5/1998 | Chau et al. | 379/207 |
| 5,768,359 | 6/1998 | DiPierro, Jr. et al. | 379/209 |

*Primary Examiner*—Scott Wolinsky

[57] ABSTRACT

A method and system for processing a software defined network (SDN) call initiated by a network adjunct platform (NAP) over a Small Scale Adjunct Primary Rate Interface (SSA PRI) in a telecommunications network on a call-by-call basis is disclosed. An SDN subscriber triggers the NAP to initiate the SDN call. The NAP forwards set-up data to an originating toll switch programmed to accept the set-up data from the NAP. After receipt of the set-up data, the originating toll switch determines if the forwarded set-up data classifies the call as an SDN call. If the forwarded set-up data contains SDN parameters, the originating toll switch processes and routes the call initiated by the NAP as an SDN call. The originating toll switch is also able to process and route non-SDN calls utilizing the same SSA PRI used for SDN calls. The need for separate dedicated trunk groups for SDN subscribers is alleviated.

17 Claims, 3 Drawing Sheets

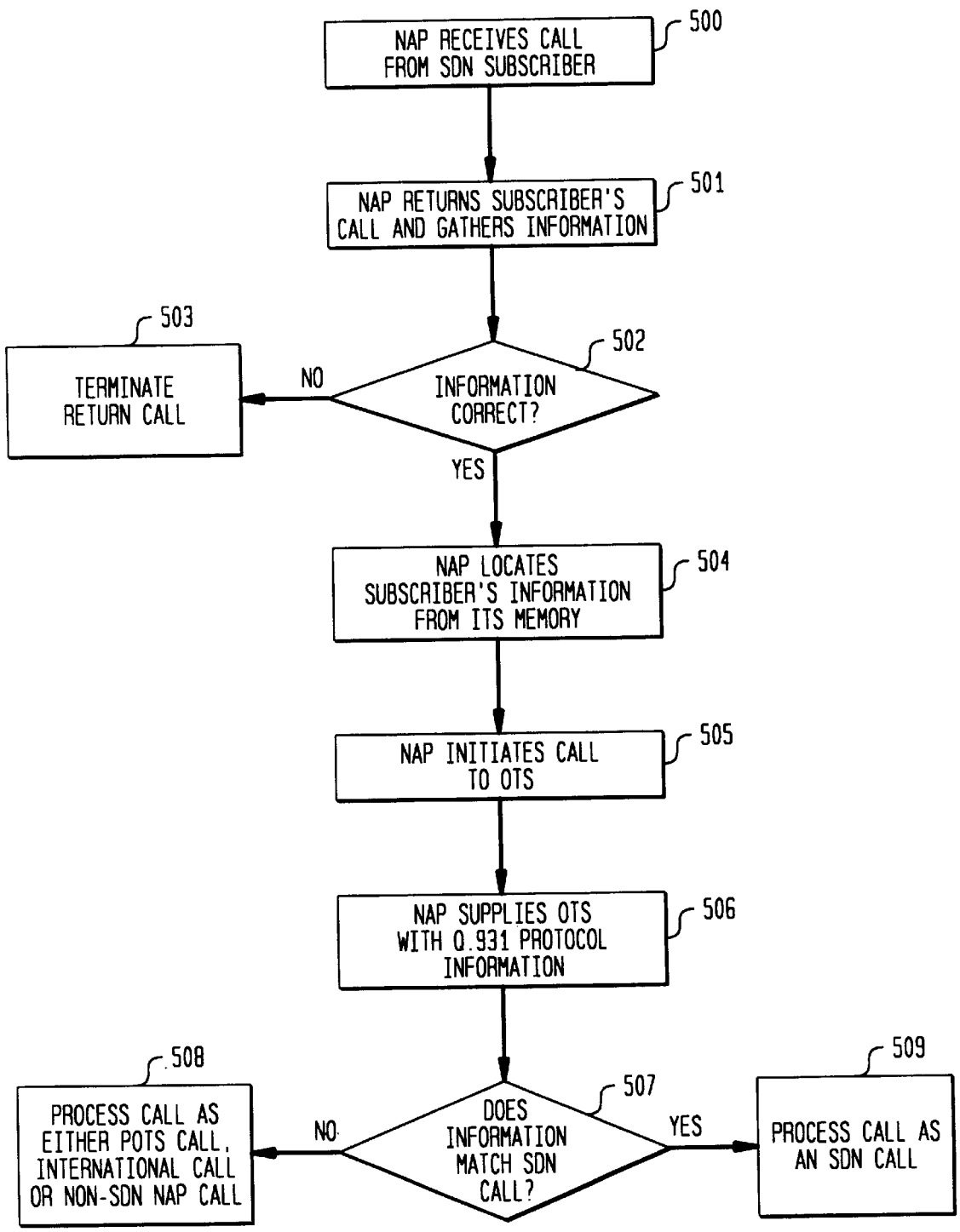

METHOD AND SYSTEM FOR INITIATING A SOFTWARE DEFINED NETWORK CALL VIA A NETWORK ADJUNCT PLATFORM

TECHNICAL FIELD

This invention relates generally to the processing of telephone calls by a switching network and more particularly, to programming the switching network to process software defined network (SDN) calls initiated by a network adjunct platform (NAP) over a Small Scale Adjunct Primary Rate Interface (SSA PRI) on a call by call basis. In addition to processing SDN calls, the switching network maintains the ability to process other types of calls utilizing the same SSA PRI used for SDN calls.

BACKGROUND OF THE INVENTION

Many telephone subscribers, particularly large business entities, provide sophisticated and diverse services and information to their customers over the telephone. To this end, 800 or toll-free numbers were established for customers to reach designated subscribers. The 800 service feature offers a subscriber a number of advantages. For example, an 800 telephone number may be associated with the subscriber rather than a local number for the subscriber's telephone equipment. As another example, calls placed to an 800 number may be directed to one of a number of the subscriber's geographically disposed locations based on the time of day. For example, a subscriber may have a home location and also may have a work location.

U.S. Pat. No. 5,369,695 entitled "Method of Redirecting a Telephone Call to an Alternative Destination," incorporated herein by reference in its entirety, describes a facility for redirecting a call, from a customer, from one destination point in a communication network to another destination point in the event that the customer's call has not been answered within a predetermined period of time for example, through a call forwarding feature or in the event that after the customer's call has been answered, the subscriber requests such redirection. This is accomplished by storing in the memory of a Network Control Point (NCP), a centralized data base, a ringing time value and a call redirect code to handle redirection of the 800-number call.

Further, a calling customer may initially reach the subscriber by dialing the toll free or 800 number provided by the subscriber. The calling customer is connected to a primary subscriber location designated to answer 800 calls. However, it may be determined that an operator at the primary subscriber's location cannot fully assist the calling customer and must redirect the call. In the event the attendant at the primary subscriber's location is unable to assist the calling customer, the primary subscriber redirects the call.

Prior art redirecting, routing and billing of calls, similar to that described in U.S. Pat. No. 5,432,845 entitled "Post Answer Telephone Call Redirection or Rerouting," incorporated herein by reference in its entirety, typically employ an adjunct processor which provides a feature referred to as a "post answer call redirection" which monitors the customer's call after it is answered by an attendant or other subscriber personnel at the primary location. If the call is to be redirected from the primary location to an alternate location, the adjunct is signaled by inband signaling, for example, a dual tone multi-frequency (DTMF) sequence, or by out of band signaling, for example, common channel interoffice signaling (CCIS). The adjunct responds by putting the calling customer on hold and initiating a call to the alternate location. The second call is initiated in such a way that it emulates or imitates both the routing and billing characteristics of a call made from the original calling customer's location. This feature is important because it bills the subscriber of the 800 number only for the first call and not the redirected call.

Besides 800 numbers, other intelligent systems, including "virtual private networks" and "software defined networks" (SDN) utilize the important features of routing, redirecting, and billing. The SDN system requires a subscriber to have a special internal dialing plan where the subscriber may make calls from many locations. Usually, SDN subscribers are large business entities; however, the system may be used by individuals. A toll office receives a special internal dialed number from the business subscriber where the dialed number is translated in a database to determine the routing of the call. The SDN system is implemented by retrieving subscriber stored numbers located in the database. The business subscriber dials the special internal number, a subscriber stored number is retrieved and the call is quickly routed to the desired party at a savings to the subscriber. U.S. Pat. No. 5,481,603, entitled "Intelligent Call Processing Based Upon Complete identification of Calling Station," incorporated herein by reference in its entirety, employs an intelligent processing method for routing intelligent systems using a local database called a global title translation (GTT) database incorporated with an originating switch to receive a query fully identifying the calling station. The GTT database responds to the query by identifying the particular NCP in the telecommunications network that contains the appropriate record for completing the call.

U.S. Pat. No. 5,103,475 entitled "Processing of the Telecommunications Call Billing Data," incorporated herein by reference in its entirety, describes a method for preparing a billing record for a special service telecommunications call such as a call over a software defined network. In order to properly bill and route SDN calls, multiple data bases are consulted to obtain the necessary information for handling these calls. A processor, implemented in a toll switch is programed to accept and store information associated with the routing and billing of SDN calls.

Since the computer processing switches that route calls within the telecommunications network typically lack sufficient capability to process customized services such as customized billing, call forwarding, answering services, voice messaging, and the like, separate processors, referred to as adjuncts have been incorporated in the telecommunications network. U.S. Pat. No. 5,550,911 entitled "Adjunct Call Handling for Accessing Adjunct-Based Capabilities Platform," incorporated herein by reference in its entirety, describes a method for allowing certain types of adjunct applications for telecommunications networks that require caller interaction during a call setup to temporarily access the adjunct and then to release the call back to the network for routing to the final destination. Specifically, when the call enters the network, the network originating switch directs certain calls to the adjunct. The adjunct may be locally located at the originating switch or may be located remotely off a centrally located switch. Once the call has been routed to the adjunct and caller interaction has been completed, the adjunct releases the voice connection back to the switch which then routes the call to its final destination. While adjuncts in the telecommunications network are able to route many different types of calls, adjuncts currently are not able to route software defined network calls. Accordingly, what is required is a network adjunct platform (NAP) capable of initiating the SDN call to a switch and supplying the switch with data to process the NAP initiated SDN call through the telecommunications network.

SUMMARY OF THE INVENTION

The present invention is directed to a system, method and apparatus for programming a telephone network switch in a telecommunication network such that the telephone network switch accepts software defined network (SDN) calls initiated by a network adjunct platform (NAP) over a Small Scale Adjunct Primary Rate Interface (SSA PRI) on a call by call basis. More particularly, the present invention is described in relation to modifying existing switching networks to recognize and allow SDN calls initiated by the NAP without affecting the quality and service provided by the SDN system.

In accordance with an embodiment of the present invention, a method is provided for programming a network switch for processing SDN calls initiated by the NAP. The SDN subscriber, who is also the calling party, triggers the NAP to initiate a call. For example, a subscriber may trigger the NAP by using direct inward dialing (DID) to originate a call to the NAP. As used herein, the subscriber or caller originates a call and the NAP initiates a call. The NAP returns the SDN subscriber's call by dialing a number previously stored in the NAP's memory associated with the call placed by the SDN subscriber. The stored number indicates the location where the SDN subscriber wishes the NAP to return the call. This stored number can be changed at any time prior to placing the initial call to the NAP.

When the SDN subscriber's call is returned, the NAP prompts the SDN subscriber for information such as a password or the telephone number of a desired called party. After receiving the correct information, the NAP initiates a SDN call to a telephone switch network for processing. The switch is supplied with data which recognizes the call initiated from the NAP as an SDN call and processes the call as an SDN call while maintaining the ability to process other type of calls.

The foregoing features of the present invention, as well as the advantages offered thereby, are achieved by the present invention which provide: a telecommunications system having a plurality of switches, a method of initiating a software defined network (SDN) call by a network adjunct platform (NAP), comprising the steps of: signaling a NAP to contact a subscriber; providing data identifying said subscriber to said NAP; contacting said subscriber by said NAP; receiving information from said subscriber; retrieving stored data associated with said information received from said subscriber; initiating a call by said NAP to a switch based on said retrieved data; forwarding by said NAP, set-up data with said initiated call; determining whether said initiated call requires SDN switch processing; and processing said initiated call as an SDN call when said call requires SDN switch processing.

BRIEF DESCRIPTION OF THE DRAWINGS

The invention will be described in detail herein with reference to the following figures in which like reference numbers refer to the elements, and wherein:

FIG. 4 is a logical flow diagram for routing the SDN call via the NAP.

DETAILED DESCRIPTION OF THE PREFERRED EMBODIMENTS

The principles of the present invention are illustrated in a preferred embodiment which provides a routing scheme for processing an SDN call initiated by a NAP from a subscriber or calling party 1 to a desired called party 7.

Figure 1:
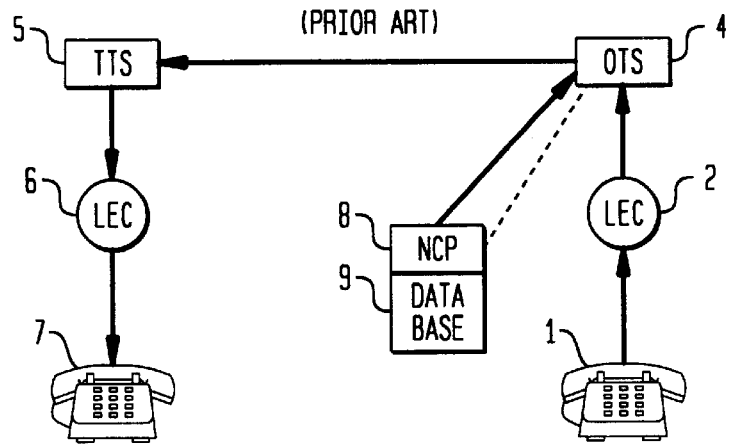
FIG. 1 is an illustration of a prior art system for processing calls without using a NAP system.

According to prior art FIG. 1, a typical calling party or subscriber 1 may be an individual or an entity and may use a personal, business, mobile or pay or other telecommunication apparatus to establish a call. Typically, calling party/subscriber 1 is coupled via an originating local exchange carrier (LEC) 2 to an originating toll switch (OTS) 4 for example an originating AT&T switch. Such switches, for example, may comprise #4 electronic switching system manufactured by Lucent Technologies, Inc. or other large or small toll switches known in the art.

Figure 1A:
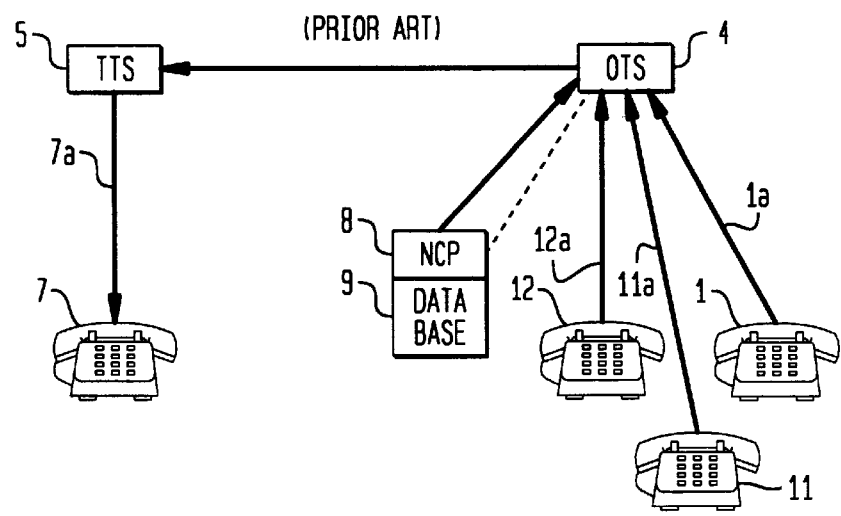
FIG. 1a is an illustration of a prior art system for processing SDN calls without using a NAP system.

In another embodiment (not shown), the LEC 2 is bypassed. For example, the calling party/subscriber 1 may be directly connected to OTS 4 as in a cellular telephone connected to a toll switch or other LEC bypass equipment. In yet another embodiment (not shown) the calling party/subscriber 1 may represent a personal computer accessing the public switched telephone through the Internet. Such access may occur at the LEC 2 or at the OTS 4. Referring to FIG. 1a, when the calling party/subscriber 1 is an SDN caller, dedicated trunk groups 1a and 7a are established between calling party/subscriber 1 and OTS 4 and between a terminating toll switch (TTS) 5 and a called party 7, respectively. These dedicated trunk groups form direct connections between the calling party/subscriber 1 and the called party 7. In the case where multiple SDN subscribers 1, 11 and 12, place calls into the network, each SDN subscriber is assigned a separate dedicated trunk group such as 1a, 11a and 12a for placing SDN calls. Moreover, each dedicated trunk group is only used for SDN calls. OTS 4 recognizes these trunk groups as SDN calls assigned to a particular subscriber. Other types of calls such as local calls, long distance calls, 800 calls etc. are unable to use these dedicated trunk groups.

Referring again the FIG. 1, OTS 4 is shown directly linked to the terminating toll switch (TTS) 5, for example, Terminating AT&T Switch and OTS 4 communicates with a network control point (NCP) 8. In a typical toll network, a plurality of toll switches may be linked by toll trunks or other links that may comprise facilities of optical fiber, land-based microwave, satellite or other facilities known in the art (not shown).

NCP 8 having a database 9, is shown coupled to OTS 4. NCP 8 is a shared resource and may be coupled to many, if not all, switches of a plurality of a particular toll network. NCP 8 typically comprises a programmed computer and memory and may store a table of identification data such as telephone numbers, credit card numbers, and the like. Database 9 also comprises a programmed computer and memory to update NCP 8.

Types of calls using the telecommunication network in FIGS. 1 and 1a include 800 calls, 900 calls, long distance calls, private numbering plan calls, software defined network calls, etc. The OTS 4 is typically arranged to provide processing of these calls which may query database 9 directly, call NCP 8 and retrieve information specific to a subscriber. This enables each 800, 900, private numbering plan or SDN subscriber to provide different routing or treatment that best suit the subscriber.

A feature of the SDN calling system is that there may be priority established for certain calls. For example, outbound calls from an executive of the SDN system may receive different treatment from call originating by another employee. This feature makes the SDN calling system a private network for its subscribers.

Again referring to prior art FIG. 1, it is assumed that the calling party/subscriber's call includes an Automatic Number Identification (ANI) identifying the origin of the call. For example, once the calling party/subscriber 1 places a call, database 9, associated with OTS 4, is checked to determine if there is any entry stored for the particular ANI associated with the calling party/subscriber 1. If any entry is found, the record contains the identity, typically in the form of a "point code" or address, for the particular NCP 8 which contains the call processing record for the call, as well as the subsystem number and customer ID which are needed to process the call. In response to the identification, a query is routed to the appropriate NCP 8 for further processing of the call. The call is eventually terminated with LEC 6 and desired called party 7 is notified of the call.

Figure 2:
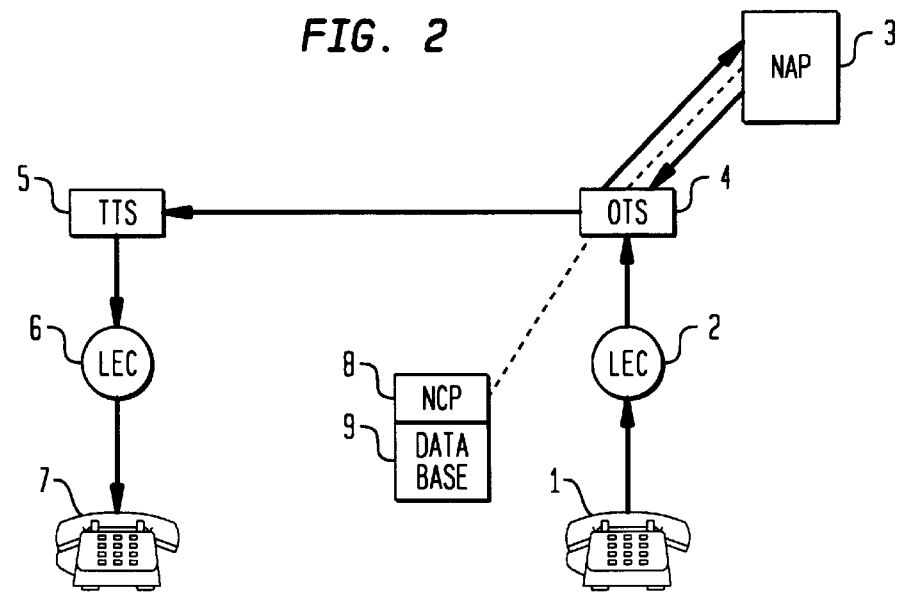
FIG. 2 is an illustration of a system for processing a call using NAP capabilities.

FIG. 2 shows an illustration of a network adjunct platform (NAP) 3 employed in the telecommunication network system. The originating toll switch (OTS) 4 is responsible for determining whether a NAP 3 is necessary to process an adjunct-based application for a given telephone call. Adjunct-based applications include, but are not limited to, post answer call redirection or 800 numbers.

As part of the determination as to whether the NAP 3 is needed to direct a call, the OTS 4 may first perform a type of call trigger function to make an initial determination as to whether an incoming call to OTS 4 is a type of call for which the NAP 3 is necessary. Since the types of calls requiring adjunct access differs on a call-by-call and service-by-service basis, requirements for the type of call trigger function must be defined on an application-by-application basis. Once it is determined that NAP 3 is required to complete the call, OTS 4 forwards data to the NAP 3 for processing and for routing the call.

However, if the call does not need the NAP 3 for processing, the call is routed through the OTS 4 and is processed by the NCP 8 as shown in FIG. 1.

Figure 3:
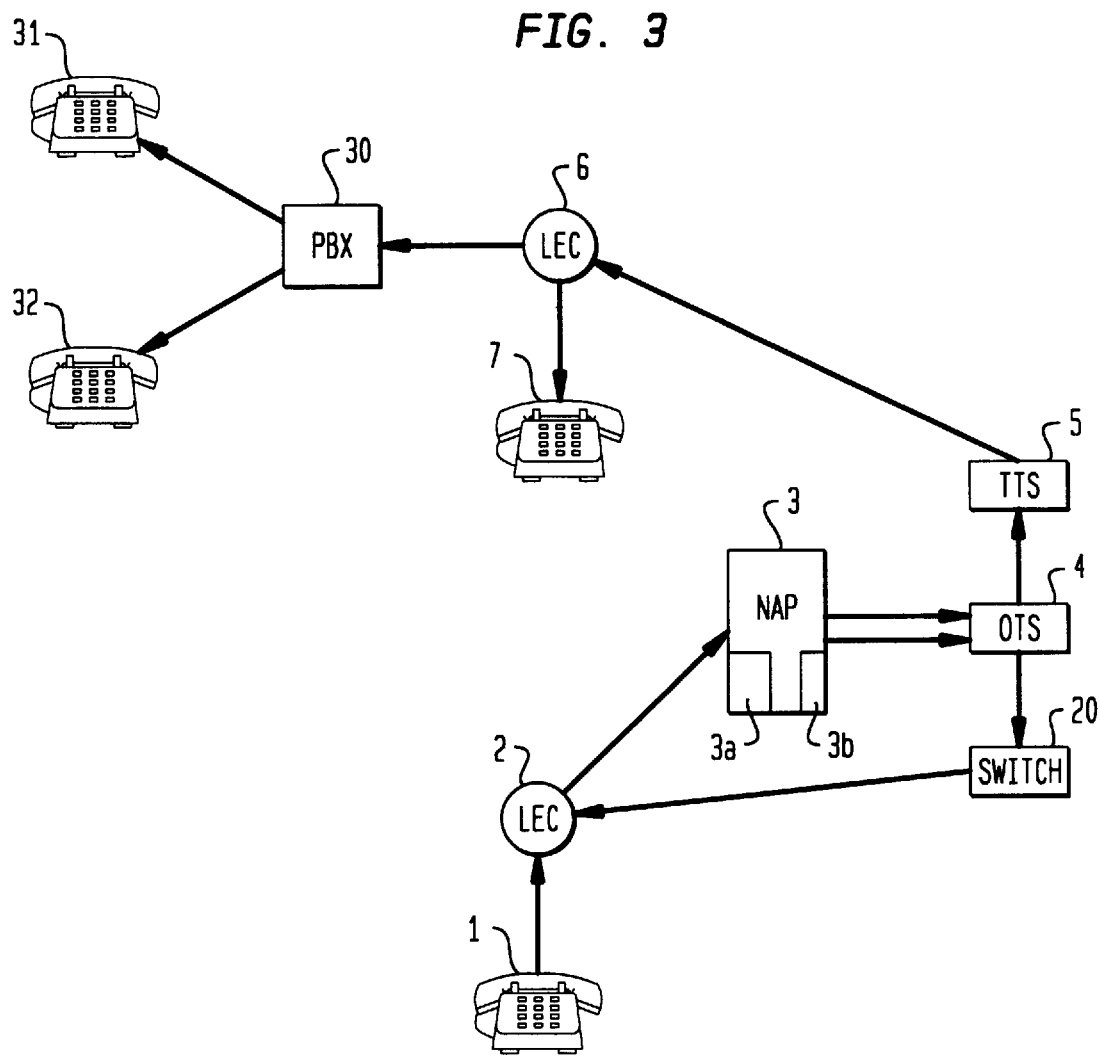
FIG. 3 is a block diagram of a system arranged to route an SDN call, originated by an SDN subscriber, to the NAP. The NAP returns the SDN subscriber's call and initiates a call to a desired called party.

Referring to FIG. 3, and in accordance with the present invention, a calling party 1 who is the SDN subscriber enters the telecommunication network by performing a triggering function activating NAP 3. The triggering function for example, may include the features of direct inward dialing (DID) wherein the SDN subscriber dials a special telephone number which originates a call. The special number is unique to SDN subscribers. The originating call 1 may be routed through to local exchange carrier (LEC) 2 as shown or directly to the NAP 3 (not shown). The NAP 3 includes a processor which recognizes this special dialed number as a SDN call. The NAP 3 locates the subscriber's information associated with the dialed number (a return telephone number) stored in a memory 3a and returns the SDN subscriber's call. By using DID, the NAP 3 receives the originating call from the SDN subscriber but does not answer the call. The SDN subscriber allows the phone to ring for an allotted two or three rings and hangs up. The NAP 3 retrieves information associated with the dialed number and returns the SDN subscriber's call. The call returned by the NAP 3 is routed through OTS 4. OTS 4 may include a memory sufficient to maintain an Automatic Number Identification (ANI) which will be used for billing and identification purposes. Moreover, OTS 4 includes a controller used to efficiently route calls.

OTS 4 routes the call through to another switch 20 having a memory, a microprocessor and a controller, which routes the call back to LEC 2. At this point, NAP 3 returns the SDN subscriber's originating call and prompts the SDN subscriber for information regarding the call the SDN subscriber wishes to place. The NAP prompts the SDN subscriber to supply information by a voice activated response or by DTMF inputs. NAP 3 solicits information such as, for example, a password to verify a legitimate SDN subscriber. The NAP 3 also prompts the SDN subscriber to supply a desired called number which has been previously stored in a memory 3b of the NAP 3.

In accordance with the present invention, the NAP 3 sends a set-up message such as a Q.931 protocol to a microprocessor located in OTS 4 for processing the call. The Q.931 protocol information forwarded to the microprocessor is capable of distinguishing SDN calls from non-SDN calls.

Q.931 protocol comprises data representing the routing number of the desired called party, the numbering plan identity, the type of number identifier, the network specific facility (NSF), the transfer capability identifier of the bearer capability and the billing customer number. The routing number is the desired called number stored in memory 3b of the NAP. Data representing the routing number can be a 7-digit number or a 10-digit number which identifies a desired called party.

The numbering plan identity data represents either an integrated service digital network (ISDN) or a private numbering plan such as a software defined network. The type of number identifier data represents the type of call being made. For example, the type of number identifier data may represent an international call. Other types of number identifier data include data which represents national numbers or more commonly known as long distance calls and subscriber numbers. Subscriber numbers are numbers associated with a private network plan such as a software defined network.

The NSF data at least includes data associated with identifying a call as either a software defined network call or a call that does not incorporate the features of a private network plan.

The transfer capability identifier of the bearer capability represents data associated with the type of signal being transmitted and received. For example, in most cases, voice signals are being transmitted and received. However, image signals may be transmitted and received in the present system.

The customer billing number is a 10-digit number which identifies the customer for billing purposes. This number must be included to correctly bill the customer for the call placed.

In order for OTS 4 to process the SDN call over the NAP 3, the Q.931 protocol must include certain data for OTS 4 to recognize the call as a SDN call. If the data associated with the numbering plan identity is "private" or "ISDN" and the type of number identifier is "national", "international" or "subscriber", and the NSF is "SDN", having the bearer capability as "voice", and the customer billing number supplied, OTS 4 will recognize the call as a SDN call and forward the call for further processing.

This SDN call is further routed to TTS 5 which includes a memory, a microprocessor and a controller for routing calls. The call is then routed to LEC 6 where the call may either be routed to the called party 7 or to a PBX 30 or other telecommunication instruments to reach other desired called parties 31 and 32. If the Q.931 protocol data does not match the requirements for an SDN call, the call is routed as in FIG. 2 which utilizes the features of a NAP for non-SDN call processing.

FIG. 4 is a flow diagram of the present invention. In step 500, the SDN subscriber places an originating call to NAP 3. Using DID, the NAP 3 returns the SDN subscriber's originating call and prompts the SDN subscriber for information as shown in step 501. If the information such as a password or a stored desired called number is not correct in step 502, the return call is terminated as shown in step 503. However, if the correct information is supplied in step 502, the call proceeds to step 504 where the NAP 3 locates stored information of the subscriber. Once the NAP 3 locates the stored SDN subscriber's information containing the desired called number and verifies the password, the NAP 3 initiates a call to an OTS 4 as shown in step 505. In step 506, the NAP forwards Q.931 protocol data with the initiated call to OTS 4. If the Q.931 protocol data does not match data for the SDN call as shown in step 507, the call is processed as a regular plain old telephone service (POTS) call, a non-SDN NAP call or as an international call as shown in step 508. If the data supplied to OTS 4 identifies the call as an SDN call in step 507, the call is processed as an SDN call as shown in step 509. Processing of SDN calls are performed on a call by call basis using the same SSA PRI type as non-SDN calls. This alleviates the need to dedicate special trunk groups to handle SDN call for each particular SDN subscriber.

Although several preferred embodiments of this invention have been described in detailed therein with reference to the accompanying drawings, it is to be understood that the invention is not limited to these illustrative embodiments, and that the various changes and modifications may be affected therein by one skilled in the art without departing from the true spirit and full scope of the invention as defined in the appended claims.

I claim:

1. In a telecommunications system having a plurality of switches, a method of initiating a software defined network (SDN) call by a network adjunct platform (NAP), comprising the steps of:

receiving a trigger at a NAP to contact a subscriber;

providing data identifying said subscriber to said NAP in response to said trigger;

contacting said subscriber by said NAP;

receiving information from said subscriber;

retrieving stored data associated with said information received from said subscriber;

initiating a call by said NAP to a switch based on said retrieved data;

forwarding by said NAP, set-up data with said initiated call;

determining responsive to said set-up data whether said initiated call requires SDN switch processing; and processing said initiated call as an SDN call when said call requires SDN switch processing.

2. The method according to claim 1, wherein said step of receiving a trigger comprises receiving a direct inward dialing call.

3. The method according to claim 1, wherein said receiving information step comprises receiving a password from said subscriber.

4. The method according to claim 1, wherein said receiving information step comprises receiving a telephone number of a called party.

5. The method according to claim 4, wherein said telephone number of said called party is stored in a memory of said NAP.

6. The method according to claim 1, wherein said providing data step comprises providing an automatic number identification (ANI).

7. The method according to claim 1, wherein said providing data step comprises providing a return call telephone number.

8. The method according to claim 1 further comprising the step of evaluating said set-up data by said switch.

9. The method of claim 1 wherein said step of determining whether said initiated call requires SDN switch processing comprises:

identifying a numbering plan as private;

identifying a type of number as subscriber;

identifying a network specific facility as SDN;

identifying an information capability identifier as voices; and identifying a ten digit billing number.

10. A telecommunications system for initiating a software defined network (SDN) call by a network adjunct platform (NAP), comprising:

means for receiving a trigger at a NAP to contact a subscriber;

means for providing data identifying said subscriber to said NAP in response to said trigger;

means for contacting said subscriber by said NAP;

means for receiving information from said subscriber;

means for retrieving stored data associated with said information received from said subscriber;

means for initiating a call by said NAP to a switch based on said retrieved data;

means for forwarding by said NAP, set-up data with said initiated call;

means for determining responsive to said set-up data whether said initiated call requires SDN switch processing; and means for processing said initiated call as an SDN call when said call requires SDN switch processing.

11. The system of claim 10, wherein said receiving a trigger means comprises means for receiving a direct inward dialing call.

12. The system of claim 10, wherein said received information is a password.

13. The system of claim 10, wherein said received information is a telephone number of a called party.

14. The system of claim 10, wherein said identifying data is an automatic number identification (ANI).

15. The system of claim 10, wherein said identifying data is a return call telephone number.

16. The system of claim 10, wherein said set-up data comprises:

a routing number;

a numbering plan identity;

a type of number identifier;

a network specific facility; and an information transfer capability identifier.

17. The system of claim 16, wherein said routing number identifies a called party.

* * * * *